Patented Feb. 28, 1939

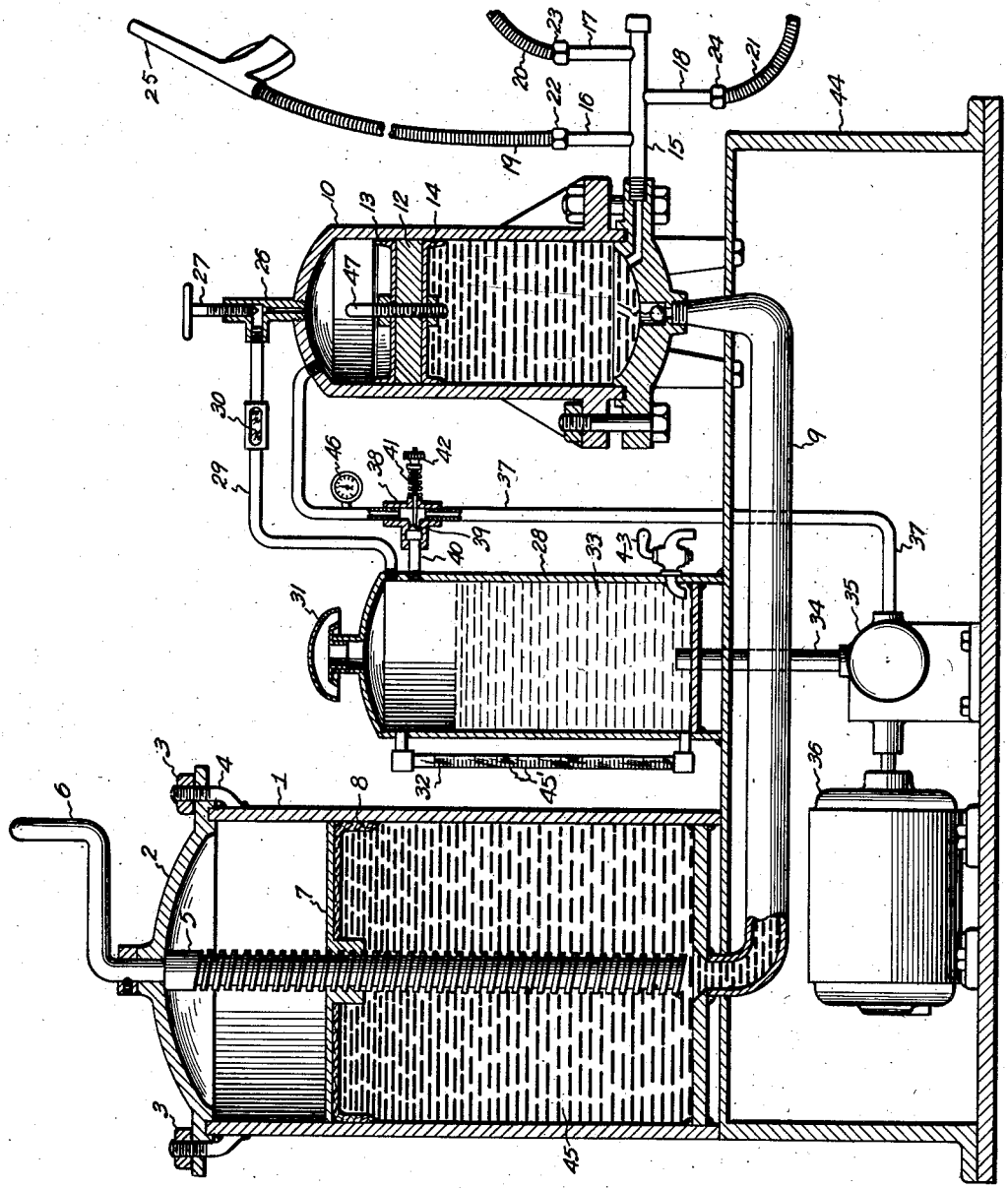

2,148,767

UNITED STATES PATENT OFFICE 2,148,767

GREASE DISPENSING APPARATUS

Wayne H. McGlade, Wellington, Kans.

Application January 18, 1936, Serial No. 59,699

2 Claims. (Cl. 221—47.1)

My invention relates to a grease dispensing apparatus and more particularly to an apparatus for dispensing heavy greases.

In order to dispense heavy greases, considerable pressure is required. In the grease dispensers of the prior art, this pressure has been obtained in most instances by means of an air piston operating a plunger of much smaller cross sectional area in order to obtain a mechanical advantage. Of necessity the grease dispensing device must be of limited size and it is difficult to obtain a high rate of flow, due to the fact that the grease dispensing plunger must complete a plurality of strokes to move an appreciable quantity of grease. The average rate of flow of an efficient grease dispensing device using an air piston is about seven ounces of grease per minute.

The use of air has in practice shown several disadvantages. Air leaking by the piston causes oxidation, polymerization and sludging of the grease. The oxidation forms organic acids and corrosive compounds, which cause corrosion. Air locks are formed with the result that the grease is channeled by the air and frequently filled with small bubbles of air.

Air always contains an amount of moisture which causes the grease to break down due to the hydrolyzation of the soaps employed in forming the grease.

One object of my invention is to provide a hydraulic grease dispensing device in which no air is employed to move the grease.

Another object of my invention is to provide a grease dispensing apparatus which is capable of dispensing a heavy grease at a high rate.

A further object of my invention is to provide a grease dispensing apparatus which is simple of construction and flexible in operation.

Other and further objects of my invention will appear from the following description.

The accompanying drawing is a diagrammatic view showing a cross section of an apparatus embodying one form of my invention.

A receptacle 1 is provided with a readily removable cover 2 secured thereto by means of nuts 3, which are threaded upon studs 4. The cover 2 carries a threaded shaft 5 adapted to be rotated by a crank 6. The threaded shaft 5 engages a piston 7 which is threaded centrally and is adapted to be moved upon rotation of the shaft 5. The piston 7 carries a packing 8 of leather or other suitable material, adapted to prevent the grease from squeezing by the piston 7. The bottom of container 1 is connected by means of a pipe 9 to the dispensing cylinder 10 through the medium of a check valve 11. A piston 12 provided with upper packing leather 13 and lower packing leather 14 is disposed within the cylinder 10. Communicating with the lower portion of cylinder 10 is a manifold 15 having branched outlet pipes 16, 17 and 18 to which the grease dispensing hose 19, 20, and 21 are connected by means of suitable unions 22, 23, and 24. Each hose is provided with a grease dispensing nozzle 25. It is to be understood that any suitable number of grease dispensing connections may be employed.

The upper end of cylinder 10 is provided with a valve housing 26 in which valve 27 is adapted to seat. A container 28, which has at least the same capacity as cylinder 10, is connected with cylinder 10 through the valve connection 26, by means of a pipe 29, which is provided with a sight glass 30. The container 28 is provided with a vent 31 and a gauge glass 32, and is normally filled with a quantity of oil 33. Connected with the bottom of container 28 is a pipe 34 which connects the suction end of a pump 35 which may be of any suitable type. The pump 35 may be driven by any suitable motor power such as electric motor 36. The pump 35 discharges through pipe 37 which leads into cylinder 10 above the level of piston 12 thereof. In line 37 is interposed a pressure adjusting device 38 which is provided with a valve 39 normally closing a pipe 40, communicating with container 28. A spring 41 tends to hold valve 39 on its seat. The tension on spring 41 may be adjusted by a nut 42. The container 28 is fitted with a drain cock 43. The assembly just described may be mounted upon any suitable base 44 so that the apparatus may be transported as a unit.

In operation, nuts 3 are loosened and the cover 2 of container 1 is removed together with the screw threaded shaft 5 and the piston 7. The container 1 is then filled with heavy grease and the cover, together with the shaft and piston, replaced and nuts 3 set tight. Crank 6 is then rotated to move the piston 7 downwardly, forcing grease 45 through pipe 9 past check valve 11, into cylinder 10. The valve 27 is open during this operation. The piston 12 is provided with a projection 47 which limits the upward movement of the piston. When the piston 12 has reached its upper limit of movement and the cylinder 10 is filled with grease, as will be apparent by the metallic sound occasioned by member 47 striking the upper wall of the cylinder 10, or by the resistance to further movement on crank 6, the motor 36 is started and oil is pumped from container 28 through line 34, through pump 35, through line 37, to the space within cylinder 10 above the piston 12. The valve 27 being open, the space above the piston 12 will fill with oil which will overflow and pass through line 29 back into the container 28. Entrapped air and/or gases will be displaced by the oil and vented from the system through vent 31. When the space within cylinder 10 above the piston 12 is filled with oil, which will be evidenced by the passage of oil through sight glass 30, the pump is stopped and valve 27 is closed. Gauge glass 32 is provided with calibration marks 45'. After the valve 27 is closed, if the level of oil within container 28 is below the uppermost of the calibration marks, vent 31 is removed and sufficient oil is added to bring the level of the oil within the container to the uppermost mark. If the oil level within the container is above the uppermost mark, an amount of oil is drained from container 28 through drain cock 43. When it is desired to dispense grease into the bearings of a device to be greased, as for example, a motor car, the pump is started. Oil discharged from pump 35 through line 37 to the top of piston 12 will tend to force the piston downwardly. The check valve 11 prevents grease from backing through pipe 9. The grease dispensing nozzles being closed, grease cannot escape through the manifold 15 to the grease dispensing hose. The pressure will then build up. The amount of pressure necessary to move the grease with desired rapidity varies with different types of greases, heavier grease requiring more pressure. The capacity of the motor and pump unit is sufficiently great to move the heaviest grease at a high rate of flow. If, for example, it was desired to move a heavy grease at a pressure of 5,000 pounds per square inch, the nut 42 would be adjusted to increase the tension upon spring 41 until a pressure of 5,000 pounds showed upon gauge 46. When this pressure is reached, valve 39 will be forced off of its seat by-passing the oil through pipe 40 back into container 28. It will be observed that, no grease being dispensed, the oil is simply circulated from the container and back again, thus making no change of the level of the oil within container 28. When nozzle 25 is operated to open the same, grease will pass therefrom at a predetermined pressure, due to the downward movement of piston 12. The downward movement of piston 12 will increase the space within cylinder 10 above the piston, which will be filled with oil removed from container 28. It is apparent that the amount of grease dispensed will be faithfully reflected by a decrease in the level of the oil in the container 28. When all of the oil in container 28 up to the level as determined by the position of pipe 34 within the container 28 has been transferred from the container to cylinder 10, the piston 12 will be at the desired point of the bottom of its stroke, and suction will be lost. This will be reflected by a drop of pressure in the gauge 46. At this time, valve 27 is opened and crank 6 is again operated as described hereinbefore.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

For example, valve 39 may be replaced by a diaphragm or plunger, the movement of which is adapted to operate an electric switch or relay to cut off the electrical supply to the motor. In this arrangement, the motor will stop when the predetermined pressure is reached. Similarly, if an air motor is employed, the valve 39 may be made to operate to shut off the air supply to the air motor. If desired, in the case of an air motor, the control arrangement may be dispensed with and the air motor may be permitted to stall when the desired pressure is reached. This will depend upon the pressure of air supplied to run the air motor.

Having thus described my invention, what I claim is:

1. A grease dispensing apparatus including in combination a cylinder, a piston within said cylinder, said cylinder being adapted to position grease on one side of said piston, a grease dispensing nozzle, means providing direct communication between the grease within said cylinder and said nozzle, a reservoir, liquid within said reservoir, a pump adapted to draw liquid from said reservoir, a discharge conduit for said pump communicating with said cylinder on the other side of said piston, means for operating said pump to apply liquid pressure upon said piston to displace the same to force grease out of said cylinder, a relief valve for said cylinder communicating therewith above said piston, said relief valve being adapted to lift at a predetermined pressure, means providing communication between the outlet of said relief valve and said reservoir, and a liquid level gauge for said reservoir adapted to show the liquid level therein, said gauge being provided with calibration marks.

2. In a grease dispensing apparatus, a cylinder adapted to contain grease, a piston in said cylinder, an oil reservoir, a pump for pumping oil from said reservoir into said cylinder behind said piston whereby oil is adapted to displace grease contained within said cylinder in front of said piston, and an oil level gauge for said reservoir showing the level of oil therein, said gauge being provided with calibration marks.

WAYNE H. McGLADE.